Jan. 25, 1949.
M. J. STATEMAN
2,459,848
RECTIFIER ELEMENT
Filed July 17, 1945
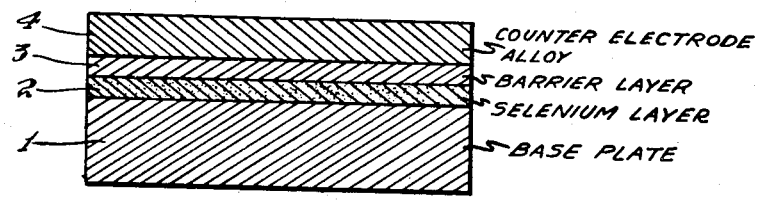
INVENTOR.
Murray J. Stateman
BY
ATTORNEY Patented Jan. 25, 1949

2,459,848

UNITED STATES PATENT OFFICE 2,459,848

RECTIFIER ELEMENT

Murray J. Stateman, Brooklyn, N. Y., assignor to Federal Telephone and Radio Corporation, New York, N. Y., a corporation of Delaware Application July 17, 1945, Serial No. 605,616

4 Claims. (Cl. 175—366)

The invention refers to rectifier elements particularly those which can withstand a very high reverse voltage.

It is, therefore, the main object of the present invention to provide rectifier elements which withstand at least five times the normal reverse voltage.

It is very well known that in manufacturing rectifier elements a base plate is covered with a rectifying layer of selenium, the latter converted into its metallic state, whereupon various procedures are used to enable the rectifier elements to withstand higher reverse voltage, for example the application of insulating lacquers or oxidizing agents to the metallic selenium surface. Finally, a counterelectrode layer is applied.

According to the present invention, instead of the mentioned application of insulating lacquers or oxidizing agents to the metallic selenium surface, there is provided a process for the forming of a barrier layer comprising a metallic organic polyselenide, as cadmium organic polyselenide or a tin organic polyselenide.

This type of barrier layer upon a metallic selenium surface may be produced in the manner disclosed and claimed in my copending patent applications Serial No. 593,542, filed May 12, 1945, entitled "Method of manufacturing rectifier elements" and Serial No. 605,617, filed July 17, 1945 also entitled "Method of manufacturing rectifier elements." According to these applications, the barrier layer is formed by making the metallic selenium coated element the cathode in electrolysis of an aqueous alkaline electrolyte containing a cadmium or tin compound and an organic substance of the class consisting of water soluble alcohols, water soluble aldehydes, water soluble ketones, water soluble organic acids and water soluble phenols, the anode used being cadmium or tin depending upon and corresponding to the metal compound in the electrolyte.

With the above mentioned object and other objects in view, the present invention will be clearly understood from the following detailed description in connection with the accompanying drawing, in which the rectifier element is shown diagrammatically.

Referring now to the drawing, which is a central transverse section through a rectifier element with the various portions substantially exaggerated in thickness, the rectifier element according to the present invention comprises a metal base plate 1 which carries a selenium layer 2. A barrier layer 3 of metal organic polyselenide is provided on the selenium layer and finally a counterelectrode 4 formed on the barrier layer 3.

Although any metal organic polyselenide can be used for the barrier layer preferably cadmium, tin, lead, silver, gold, zinc, copper, brass and other metals are used for the selenide. The organic agent in the metal organic selenide can be any alcohols, aldehydes, ketones, acids, phenols and the like and particularly those organic agents which are soluble in water.

Rectifier elements which are equipped with a barrier layer of metal organic polyselenide according to the present invention withstand up to more than 100 volts A. C. in the reverse direction.

While I have disclosed the principles of my invention in connection with several different embodiments, it will be understood that these embodiments are given by way of example only and not as limiting the scope of the invention as set forth in the objects and the appended claims.

What I claim is:

1. In a dry rectifier element a metal base plate, a selenium layer on said base plate, a barrier layer on said selenium layer comprising an organic selenide of a metal of the class consisting of cadmium and tin, and a counterelectrode on said barrier layer.

2. In a dry rectifier element, a metal base plate, a selenium layer on said base plate, a barrier layer comprising a cadmium organic selenide, and a counterelectrode on said barrier layer.

3. In a dry rectifier element, a metal base plate, a selenium layer on said base plate, a barrier layer comprising a tin organic selenide on said selenium layer and a counterelectrode on said barrier layer.

4. The dry rectifier element, as set forth in claim 1, in which said barrier layer comprises a metal polyselenide containing an organic agent chosen from the group of alcohols, aldehydes, ketones, acids and phenols.

MURRAY J. STATEMAN.

REFERENCES CITED

The following references are of record in the file of this patent:

UNITED STATES PATENTS

| Number | Name | Date |
|---|---|---|
| 2,193,598 | Lotz | Mar. 12, 1940 |
| 2,193,610 | Wilson | Mar. 12, 1940 |

FOREIGN PATENTS

| Number | Country | Date |
|---|---|---|
| 58,421 | Norway | Sept. 27, 1937 |
| 116,910 | Australia | Apr. 28, 1943 |